US012789252B2

(12) United States Patent
Niu et al.

(10) Patent No.: US 12,789,252 B2
(45) Date of Patent: Nov. 10, 2026

(54) RE-USED NI-BASED ALLOY POWDER FOR ADDITIVE MANUFACTURING AND METHOD FOR PRODUCING ADDITIVE MANUFACTURING PRODUCT

(71) Applicant: Proterial, Ltd., Tokyo (JP)

(72) Inventors: Jing Niu, Tokyo (JP); Kousuke Kuwabara, Tokyo (JP)

(73) Assignee: Proterial, Ltd., Tokyo (JP)

( * ) Notice: Subject to any disclaimer, the term of this patent is extended or adjusted under 35 U.S.C. 154(b) by 26 days.

(21) Appl. No.: 18/728,077

(22) PCT Filed: Jan. 10, 2023

(86) PCT No.: PCT/JP2023/000260

§ 371 (c)(1),
(2) Date: Jul. 10, 2024

(87) PCT Pub. No.: WO2023/136233

PCT Pub. Date: Jul. 20, 2023

(65) Prior Publication Data

US 2025/0091128 A1 Mar. 20, 2025

(30) Foreign Application Priority Data

Jan. 14, 2022 (JP) ................................ 2022-004110

(51) Int. Cl.
*C22C 19/05* (2006.01)
*B22F 1/17* (2022.01)
(Continued)

(52) U.S. Cl.
CPC .............. *B22F 1/17* (2022.01); *C22C 19/055* (2013.01); *C22C 38/02* (2013.01); *C22C 38/06* (2013.01);
(Continued)

(58) Field of Classification Search
CPC .... B22F 1/16; B22F 1/17; B22F 10/28; B22F 10/73; B22F 2301/15; B33Y 10/00;
(Continued)

(56) References Cited

U.S. PATENT DOCUMENTS

2020/0206816 A1* 7/2020 Daigo ..................... B22F 10/28
2021/0301372 A1* 9/2021 Harrison ............... C22C 19/056
(Continued)

FOREIGN PATENT DOCUMENTS

JP 2019077937 5/2019
JP 2020059902 4/2020
(Continued)

OTHER PUBLICATIONS

"International Search Report (Form PCT/ISA/210) of PCT/JP2023/000260", mailed on Mar. 14, 2023, with English translation thereof, pp. 1-6.

*Primary Examiner* — Hoa (Holly) Le
(74) *Attorney, Agent, or Firm* — JCIPRNET

(57) ABSTRACT

[Problem] The present invention addresses the problem of providing a re-used alloy powder for additive manufacturing and a method for producing an additive manufacturing product, wherein stable modeling is possible and defects can be suppressed even in cases where an alloy powder for additive manufacturing is re-used. [Solution] The present invention provides a re-used alloy powder for additive manufacturing, the re-used alloy powder being characterized in that: the surface of the alloy powder is provided with an oxide film; the alloy powder contains, in mass %, more than 0.015% but less than 0.106% of oxygen; and the oxide film has a maximum thickness of 200 nm or less (excluding 0).

7 Claims, 9 Drawing Sheets

(51) Int. Cl.

| | |
|---|---|
| ***C22C 38/02*** | (2006.01) |
| ***C22C 38/06*** | (2006.01) |
| ***C22C 38/08*** | (2006.01) |
| ***C22C 38/14*** | (2006.01) |
| *B22F 9/00* | (2006.01) |
| *B33Y 70/00* | (2020.01) |

(52) U.S. Cl.

CPC .............. *C22C 38/08* (2013.01); *C22C 38/14* (2013.01); *B22F 2009/001* (2013.01); *B22F 2301/15* (2013.01); *B22F 2301/35* (2013.01); *B22F 2302/25* (2013.01); *B33Y 70/00* (2014.12)

(58) Field of Classification Search

CPC ....... B33Y 70/00; C22C 19/05; C22C 19/055; C22C 19/03; C22C 19/051

See application file for complete search history.

(56) References Cited

U.S. PATENT DOCUMENTS

| | | | | |
|---|---|---|---|---|
| 2022/0143701 | A1* | 5/2022 | Daigo | B22F 10/60 |
| 2022/0145427 | A1* | 5/2022 | Daigo | B33Y 80/00 |
| 2023/0173577 | A1* | 6/2023 | Kanai | B22F 1/16<br>420/8 |
| 2023/0323513 | A1* | 10/2023 | Daigo | B33Y 70/00<br>420/442 |
| 2025/0179615 | A1* | 6/2025 | Wang | C22C 19/058 |

FOREIGN PATENT DOCUMENTS

| | | |
|---|---|---|
| JP | 2020186429 | 11/2020 |
| JP | 2020190008 | 11/2020 |
| JP | 2021025062 | 2/2021 |
| WO | 2019187112 | 10/2019 |
| WO | 2020179154 | 9/2020 |

* cited by examiner

RE-USED NI-BASED ALLOY POWDER FOR ADDITIVE MANUFACTURING AND METHOD FOR PRODUCING ADDITIVE MANUFACTURING PRODUCT

CROSS-REFERENCE TO RELATED APPLICATION

This application is a 371 application of the International PCT application serial no. PCT/JP2023/000260, filed on Jan. 10, 2023, which claims the priority benefits of Japan Patent Application No. 2022-004110, filed on Jan. 14, 2022. The entirety of each of the above-mentioned patent applications is hereby incorporated by reference herein and made a part of this specification.

TECHNICAL FIELD

The present invention relates to an alloy powder, and more particularly to the reuse of an alloy powder for additive manufacturing.

DESCRIPTION OF RELATED ART

A metal powder is an important basic material in the field of basic materials, used in powder compaction, powder metallurgy, metal injection molding (MIM), etc. The basic material technologies using metal powders are excellent in strength and mass production, making them suitable for use in a variety of industrial products. In recent years, a metal powder has also been used as a raw material for additive manufacturing (hereinafter referred to as metal additive manufacturing or simply additive manufacturing), and the importance thereof is increasing as metal additive manufacturing makes a basic material be produced without a mold.

Furthermore, in recent years, the conservation and effective use of metal resources has become increasingly important from the standpoint of environmental conservation. For example, Patent Literature 1 discloses a material powder for metal additive manufacturing that can suppress a decrease in fluidity even when recycled and a method for producing the same, in which the material powder for metal additive manufacturing is produced to have a particle size distribution corresponding to the fluidity equal to or greater than a predetermined reference value, and silica particles may be added to a virgin material based on the particle size distribution of the virgin material, which is an unused material powder, and the fluidity of the recycled material after recycling the virgin material a predetermined number of times in a metal additive manufacturing device.

RELATED ART

Patent Literature

Patent Literature 1: Japanese Patent Application Laid-Open No. 2021-25062

However, even if the material powder for metal additive manufacturing in Patent Literature 1 is repeatedly re-used, the material powder loses moldability, and is prone to metal splashes known as metal spatter during modeling. As a result, there was a problem that defects such as voids were easily generated in the additive manufacturing product.

SUMMARY

Technical Problem

Based on the above, an object of the present invention is to provide a re-used alloy powder for additive manufacturing and a method for producing an additive manufacturing product that enables stable modeling and suppression of defects even when an alloy powder for additive manufacturing is re-used.

Solution to the Problem

The present invention provides a re-used alloy powder for additive manufacturing, the re-used alloy powder includes an oxide film on a surface of the alloy powder, the alloy powder contains, in mass %, more than 0.015% and less than 0.106% of oxygen, and the oxide film has a maximum thickness of 200 nm or less (excluding 0).

It is preferable that the alloy powder is a Ni-based alloy, the alloy powder contains, in mass %, more than 0.015% and less than 0.106% of oxygen, and that the oxide film has a maximum thickness of 100 nm or less (excluding 0).

It is preferable that the alloy powder contains, in mass %, more than 0.030% and less than 0.106% of oxygen, and that the oxide film has a maximum thickness of 1 nm or more and 100 nm or less.

It is preferable that an oxide mainly composed of Ni is near an outermost surface of the oxide film.

It is preferable that the alloy powder contains, in mass %, Cr: 14.5 to 24.0%, Mo: 12.0 to 23.0%, and the remainder consists of Ni and inevitable impurities.

It is preferable that the alloy powder is an Fe-based alloy and includes an oxide film on a surface of the alloy powder, and the alloy powder contains, in mass %, more than 0.015% and less than 0.106% of oxygen, and that the oxide film has a maximum thickness of 200 nm or less (excluding 0).

It is preferable that the alloy powder contains, in mass %, more than 0.020% and less than 0.106% of oxygen, and that the oxide film has a maximum thickness of 1 nm or more and 150 nm or less.

It is preferable that the alloy powder contains, in mass %, Ni: 14% to 22%, Ti: 0.1% to 5.0%, Al: 1% or less, Si: 1% or less, and the remainder consists of Fe and inevitable impurities.

It is preferable that an oxide containing at least one of Ni, Ti, Si and Al as the most abundant element among elements contained other than oxygen is near an outermost surface of the oxide film.

It is preferable that in the alloy powder, a ratio of an integrated frequency of 90 volume % to an integrated frequency of 10 volume % in an integrated distribution curve showing a relationship between particle size and volume integrated from a small particle size side obtained by a laser diffraction method is 3.0 or more and 10.0 or less.

A method for producing an additive manufacturing product includes using an alloy powder containing any one of the above-mentioned re-used alloy powders for additive manufacturing as a raw material powder, and performing additive manufacturing using the raw material powder.

It is preferable that the raw material powder contains a re-used alloy powder for additive manufacturing having an oxide film including an oxide containing one of Ni and Fe as the most abundant element among elements contained other than oxygen and an alloy powder for additive manufacturing having an oxide film including an oxide containing an element other than Ni or Fe as the most abundant element among elements contained other than oxygen.

According to the present invention, it is possible to provide a re-used alloy powder for additive manufacturing and a method for producing an additive manufacturing product that enable stable modeling and suppression of defects even with a repeatedly re-used raw material powder.

DESCRIPTION OF EMBODIMENTS

Figure 1:
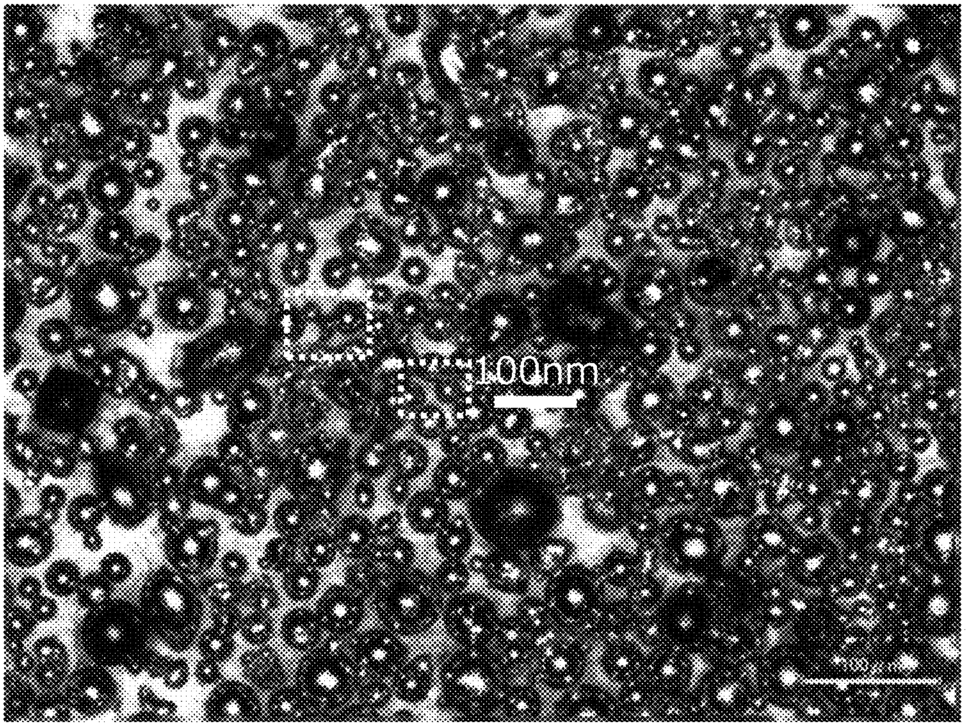
FIG. 1 is an optical microscope image of a re-used Ni-based alloy powder.

Hereinafter, embodiments of a re-used alloy powder for additive manufacturing and a method for producing an additive manufacturing product will be described in detail. First, the re-used alloy powder for additive manufacturing will be described, and then the method for producing an additive manufacturing product will be described. In the description, the "re-used alloy powder for additive manufacturing" is sometimes referred to as "re-used alloy powder" or simply as "alloy powder." In addition, an unused alloy powder that has never been subjected to additive manufacturing is sometimes referred to as "raw material powder" or "new product." In the specification, the numerical range of "to" includes the numerical values before and after by using "greater than or equal to" and "less than or equal to". In addition, when a numerical value is preceded by "more than" or "less than," the numerical value is not included. In the drawings, the same or similar parts are given the same symbols and descriptions thereof will not be repeated.

<Alloy Powder>

The re-used alloy powder of the embodiment is the reuse of a raw material powder such as a Ni-based alloy or an Fe-based alloy used in an additive manufacturing method, the alloy powder has an oxide film on a surface of the alloy powder, and the alloy powder itself contains more than 0.015 mass % and less than 0.106 mass % of oxygen, the content is preferably in a range of more than 0.020 mass % and less than 0.106 mass %, and the lower limit is more preferably more than 0.030 mass %. Furthermore, the oxide film has a maximum thickness of 200 nm or less (however, there is no case where the thickness is 0 nm), preferably 100 nm or less, and more preferably 1 nm to 150 nm. Any alloy powder that satisfies the oxygen content and the thickness of the oxide film can be re-used repeatedly for additive manufacturing.

[Alloy Composition]

The alloy powder in the embodiment of the present application may be a powder of an alloy known as a heat-resistant alloy, a corrosion-resistant alloy, and a wear-resistant alloy. More preferably, the alloy is a Ni-based alloy or an Fe-based alloy.

The Ni-based alloy refers to an alloy containing Ni as a main component and Cr, Mo, and the like as additive elements. For example, alloys that are already commercially available include M252, Waspaloy, Rene 41, Udimat 520, Inconel 718, Inconel 725, inconel 713, Inconel 738, MM246, MM247, Rene 80, GMR 235, Inconel 625, Nimonic 263, Hastelloy B, C, X materials, Hiccoroy 11, MAT21, etc. However, these are merely examples and the alloys are not limited thereto. (Further, Waspaloy is a registered trademark of United Technologies, Rene is a registered trademark of GE, Udimat is a registered trademark of Special Metals, Inconel and Nimonic are registered trademarks of HUNTINGTON ALLOYS, Hastelloy is a registered trademark of Haynes International, and MAT21 is a registered trademark of Hitachi Metals.)

The Ni-based alloy is preferably a Ni—Cr—Mo alloy, and the composition of the alloy is preferably such that, after the main component Ni, the next components Cr and Mo are, in mass %, Cr: 10.0 to 30.0%, Mo: 5.0 to 30.0%, more preferably, Cr: 10.0% to 25.0%, Mo: 8.0 to 25.0%, and particularly preferably, Cr: 14.5 to 24.0%, Mo: 12.0 to 23.0%.

In addition, the Fe-based alloy refers to an alloy containing Fe as a main component and Ni. Cr. Co, and the like as additive elements. For example, examples of materials commonly used in additive manufacturing include 18Ni maraging steels of grades 200, 250, 300, and 350 and stainless steels such as SUS304, SUS316, SUS630, SUS310S, SUH660, SCH13, and SCH22.

The Fe-based alloy used in the present application is preferably an Fe—Ni based alloy, and the composition of the alloy is preferably such that, after the main component Fe, the next component Ni is, in mass %, 14.0 to 22.0%, more preferably, Ni: 16.0 to 20.0%, and particularly preferably, Ni: 17.0 to 19.0%. Examples of such an Fe—Ni based alloy include the above-mentioned maraging steel and heat-resistant stainless steel containing a large amount of Ni.

Moreover, the Si content is, in mass %, preferably 1% or less, more preferably less than 1%, and further preferably 0.5% or less. Furthermore, the Al content is, in mass %, preferably 1% or less, more preferably less than 1%, further preferably 0.5% or less, and even more preferably 0.25% or less. In addition, Mo, Ti, etc., may also be contained, in the case of Mo, the content is, in mass %, preferably 5% or less, more preferably 0.5% to 5.0%, and further preferably 1.5% to 2.5%. In the case of Ti, the content is, in mass %, preferably 5% or less, more preferably 0.5 to 5.0%, and further preferably 1.5% to 2.5%.

(Inevitable Impurities)

C, an inevitable impurity, forms carbides with Cr in the vicinity of grain boundaries, which increases the deterioration of corrosion resistance. Therefore, the content is set to less than 0.05%. In addition, S and P segregate at grain boundaries and cause hot cracking, so the contents thereof have to be suppressed to less than 0.01%. Furthermore, the content of these inevitable impurities is preferably low, and may be 0%.

[Oxygen Content of Alloy Powder and Thickness of Oxide Film]

In the additive manufacturing method, the raw material powder (alloy powder) in the area not irradiated with the laser is repeatedly re-used, but with each repetition, the oxygen content increases due to oxidation of the powder surface. On the other hand, if metal spatter occurs when the raw material powder melts during additive manufacturing, defects are prone to occur, such as poor shape of the additive manufacturing product or metal spatter remaining in the additive manufacturing product. It has become clear that the cause of the spatter is the expansion and explosion of oxygen contained in the powder, and that the oxide film on the powder surface also has an influence.

In addition, when the metal powder is irradiated with a laser beam, multiple reflection occurs in the oxide film, which has the effect of increasing the laser absorption rate. As the heat input increases, the amount of alloy powder melted increases, and the melt pool becomes larger. As a result, residual stress due to thermal contraction occurring during solidification may exceed tensile stress, making the material more susceptible to cracking.

Therefore, it can be said that there is a limit to how much the raw material powder can be re-used. In view of this, the alloy powder according to the present invention contains, in mass %, more than 0.015% and less than 0.106% of oxygen, and the oxide film has a maximum thickness (maximum thickness) of 200 nm or less. Furthermore, it is preferable to limit the oxygen content to a range of more than 0.020% and less than 0.106%, and the maximum thickness of the oxide film to a range of 1 nm to 150 nm. More preferably, the oxygen content is in a range of more than 0.030% and less than 0.106%, and the maximum thickness of the oxide film is in a range of 1 nm to 100 nm. Also, in the case of an Fe-based alloy powder, the maximum thickness of the oxide film is preferably 20 nm to 200 nm, more preferably 50 nm to 200 nm, and even more preferably 60 nm to 150 nm.

By setting the oxygen content and film thickness within the ranges, metal spatter caused by oxygen, i.e. expansion and explosion, that occurs when the alloy powder melts can be suppressed, and stable modeling can reduce defects in the additive manufacturing product. Further, the oxygen content in the powder can be measured by an inert gas fusion infrared absorption method.

[Oxide Film (Oxide)]

It is preferable that an element that mainly constitutes the alloy powder is contained near the outermost surface of the oxide film. For example, in the case of a Ni-based alloy, it is preferable that the alloy contains an oxide mainly composed of Ni. Since the oxide mainly composed of Ni has a relatively low melting point, the oxide evaporates first when irradiated with a laser beam, making it difficult for spatter to occur. This is also believed to have no adverse effect on the melting and solidification process. In the specification, the term "main constituent element" refers to the element that is present in the largest amount among the elements contained other than oxygen.

In addition, among the metal elements constituting the alloy powder, an alloy powder having an oxide film including an oxide mainly composed of Ni and an alloy powder having an oxide film including an oxide mainly composed of a metal element other than Ni may be mixed. The oxide mainly composed of a metal element other than Ni is, for example, Ni—Cr—Mo alloy powder, and the oxide may be an oxide mainly composed of Ta, Cr, etc., which are minor components (optional additive elements). In addition to the case of a new alloy powder, the alloy powder having the oxide film including the oxide mainly composed of Ta, Cr, etc., may be an alloy powder that has been once used for modeling, and due to spatter adhering to the surface of the alloy powder once used for modeling, has an oxide film formed in greater amounts of oxides mainly composed of Ta, Cr, etc. than an unused alloy powder.

FIG. 1 shows the state when a Ni—Cr—Mo alloy powder is re-used, but an alloy powder as shown within the dashed line frame in the figure may also be included. When the cross sections of each of the alloy powders were observed, there were alloy powders having an oxide film including an oxide mainly composed of Ni and alloy powders having an oxide film including an oxide mainly composed of Ta, Cr, etc. In this way, the powder may include a powder including an oxide film mainly composed of different elements, even if the powder contains a mixture thereof, it is believed that such a way does not have a significant effect on the moldability, so long as the oxygen content in the powder is within the preferable range described above.

In addition, for example, even in the case of an alloy powder mainly composed of Fe, such as an Fe-based alloy powder, an alloy powder having an oxide film including an oxide mainly composed of Fe and an alloy powder having an oxide film including an oxide mainly composed of a metal element other than Fe may be mixed. An oxide mainly composed of a metal element other than Fe may be, for example, an oxide mainly composed of at least one of Ni, Ti, Si and Al in the case of an Fe—Ni alloy powder. In addition to the case of a new (unused) alloy powder, the alloy powder having the oxide film including the oxide mainly composed of at least one of Ni, Ti, Si and Al may be an alloy powder that has been once used for modeling, and due to spatter adhering to the surface of the alloy powder once used for modeling, has an oxide film formed in greater amounts of oxides mainly composed of at least one of Ni, Ti, Si, and Al than an unused alloy powder. This is because Si, Ti, Al, etc. are elements that are easily oxidized, and when oxidized, stable oxides such as $SiO_2$, $TiO_2$, or $Al_2O_3$ are formed.

[Particle Size]

The additive manufacturing method is a method of forming shapes by repeatedly melting and solidifying individual powders. However, if the particle size of the alloy powder is less than 5 μm, it is difficult to obtain the volume required for one melting and solidification, making it difficult to obtain a sound additive manufacturing product. On the other hand, if the particle size of the alloy powder exceeds 250 μm, the volume required for one melting and solidification is too large, making it difficult to obtain a sound additive manufacturing product. Therefore, the particle size of the alloy powder is preferably 5 to 250 μm, and more preferably, 10 μm to 150 μm. Further, a powder obtained by gas atomization, which can obtain a spherical shape, is preferable. In addition, the particle size of the powder can be measured by using, for example, a laser diffraction particle size distribution measuring device.

As an example of different methods for additive manufacturing, 10 μm to 50 μm is more preferable for the selective laser melting (SLM) method, and 45 μm to 105 μm is more preferable for the electron beam melting (EBM) method.

In addition, 30 μm to 250 μm is preferable for the laser metal deposition (LMD) method.

In addition, in an integrated distribution curve showing the relationship between particle size and volume integrated from the small particle size side obtained by a laser diffraction method, when an integrated frequency of 10 volume % is expressed as D10, an integrated frequency of 50 volume % is expressed as D50, and an integrated frequency of 90 volume % is expressed as D90, the ratio of the integrated frequency of 90 volume % to the integrated frequency of 10 volume % (D90/D10) is preferably 3.0 to 10.0, preferably 3.0 to 8.0, more preferably 3.0 to 5.0, and even more preferably 3.1 to 3.6.

If D90/D10 is 10.0 or less, the proportion of large particles is not too high, and defects due to insufficient melting of the powder during laser irradiation may be easily suppressed. In addition, if the D90/D10 is 3.0 or more, the friction between the particles constituting the powder is not too large, preventing a decrease in fluidity and suppressing poor powder spreading, it is expected that internal defects in the obtained additive manufacturing body may be suppressed.

<Method for Producing Additive Manufacturing Product>

Next, a method for producing an additive manufacturing product according to the present invention will be described with reference to FIGS. 11 and 12. An embodiment of the method for producing an additive manufacturing product is characterized in that an alloy powder containing the above-mentioned re-used alloy powder for additive manufacturing is used as a raw material powder, and additive manufacturing is performed using the raw material powder. In other words, it is sufficient that the raw material powder contains at least the re-used alloy powder of the present invention that has been repeatedly used. Although the alloy powder of the present invention may be used alone, it is preferable to use the alloy powder in combination with a new raw material powder. In addition, the alloy powder of the present invention that has already been used repeatedly can be periodically added and used.

In addition, the raw material powder may be a mixture of a Ni-based alloy powder for additive manufacturing having an oxide film including an oxide mainly composed of Ni and a Ni-based alloy powder for additive manufacturing having an oxide film including an oxide mainly composed of an element other than Ni. Alternatively, the raw material powder may be a mixture of an Fe-based alloy powder for additive manufacturing having an oxide film including an oxide mainly composed of Fe and an Fe-based alloy powder for additive manufacturing having an oxide film including an oxide mainly composed of an element other than Fe.

Further, the Ni-based alloy powder and the Fe-based alloy powder for additive manufacturing include at least a re-used product, but the Ni-based alloy powder having an oxide film including an oxide mainly composed of an element other than Ni may be a re-used product as described above, or may be a new alloy powder. Similarly, the Fe-based alloy powder having an oxide film including an oxide mainly composed of an element other than Fe may be the above-mentioned re-used product, or may be a new alloy powder.

Figure 11:
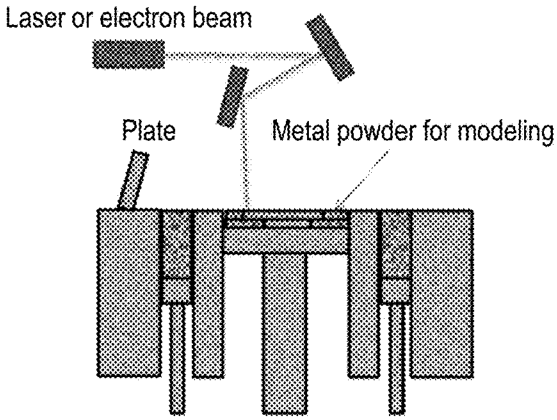
FIG. 11 shows a schematic diagram of an additive manufacturing device known as a Powder Bed Fusion method.

As a method for performing additive manufacturing, for example, an additive manufacturing device of a powder bed fusion (PBF) method shown in FIG. 11 is supplied with the Ni-based corrosion-resistant alloy powder for additive manufacturing of the present invention, and high energy such as a laser or an electron beam is irradiated onto the area where the powder is spread to selectively melt and bond the alloy powder, thereby producing an additive manufacturing product of a desired shape with additive manufacturing.

Figure 12:
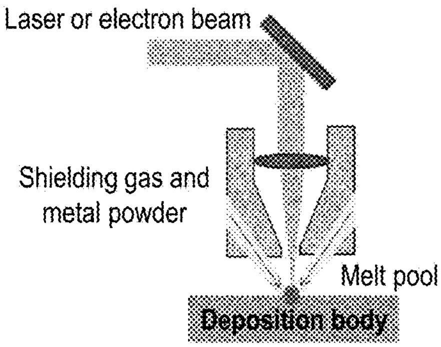
FIG. 12 shows a schematic diagram of an additive manufacturing device known as a directed energy deposition method.

In addition to the one shown in FIG. 11, depending on the shape of the additive manufacturing product, an additive manufacturing device of a directed energy deposition (DED) method as shown in FIG. 12 may be used, and the type of additive manufacturing device is not particularly limited.

[Uses/Products]

The alloy powder described above can be suitably used for additive manufacturing such as metal additive manufacturing, powder compaction, powder metallurgy, metal injection molding, and the like, but the applications or products are not particularly limited.

An additive manufacturing product using the alloy powder of the present invention are expected to be applied in a wide range of fields, such as chemical plants, pharmaceutical manufacturing facilities, or the oil and gas fields. For example, a semiconductor manufacturing equipment component that has preferable corrosion resistance and very few defects may be provided.

EXAMPLE

The present invention will now be described more specifically with reference to examples and comparative examples. However, the present invention is not limited to the examples.

Example 1

As the Ni-based alloy powder, a Ni—Cr—Mo alloy (Ni-19Cr-18Mo-2Ta) shown in Table 1 was prepared. The particle size of the alloy powder was 10 μm to 53 μm.

TABLE 1

| Element | Ni | Cr | Mo | Ta |
|---|---|---|---|---|
| Composition | Bal | 19 | 19 | 1.8 |

Next, in order to obtain the alloy powder of the present invention as a simulation, an oxidation treatment was carried out by holding the powder in an atmospheric furnace heated to 300° C. to 500° C. for 100 minutes. Specifically, an alloy powder P1 was obtained at 300° C. for 100 minutes, an alloy powder P2 was obtained at 400° C. for 100 minutes, and an alloy powder P3 was obtained at 500° C. for 100 minutes. Thereafter, measurement of oxygen content and elemental analysis along with the thickness of the oxide film in the alloy powder was carried out. The measurement method is as follows.

(Oxygen Content of Powder)

The oxygen content in the powder was measured using an inert gas fusion-infrared absorption method. Here, the measurement was performed twice and the average value was calculated.

(Thickness of Oxide Film)

In addition, the thickness of the oxide film (oxide) formed on the surface of the alloy powder was measured using a scanning transmission electron microscope (STEM), and any cross section of the alloy powder can be observed and measured. The elemental analysis method for the oxide film was carried out using energy dispersive X-ray spectroscopy (EDX), for example, and any cross section of the alloy powder can be subjected to elemental analysis. Further, the observation sample may be prepared by cutting the powder and obtaining a cut surface using a focused ion beam (FIB) micro-sampling device.

When the oxygen content and the thickness of the oxide film of the alloy powders P1 to P3 were measured, the oxygen content in the powder of P1 was 0.031%, and the maximum thickness of the oxide film was 4 nm. In addition, the oxygen content in the powder of P2 was 0.047%, and the maximum thickness of the oxide film was 7 nm. For P3, the oxygen content in the powder was 0.106%, and the maximum thickness of the oxide film was 18 nm. Further, the oxygen content (%) in the powder is expressed as in mass %.

As described above, the oxygen content in the powder of each of the alloy powders P1 to P3 was measured using the inert gas fusion-infrared absorption method, and was measured twice, and the average value was calculated. Also, the maximum thickness of the oxide film was measured at a location where the oxide film had the maximum thickness among the areas observed with a scanning transmission electron microscope (manufactured by JEOL, Model: JEM-ARM200F). Even with the same powder, a thickness of 20 nm or more may be observed depending on the observation area, but the maximum thickness is thought to be 100 nm or less. Since the oxide film is generally uniform, it is sufficient to observe the oxide film within a specific field of view and range. The alloy powders P1 to P3 were designed to simulate the oxygen content and the thickness of the oxide film in a re-used state, but in reality, it is desirable to obtain data on the number of times the alloy powder can be re-used and the oxygen content, and on the number of times the alloy powder can be re-used and the thickness of the oxide film, and to calculate in advance the number of times the alloy powder can be re-used.

Figure 2A:
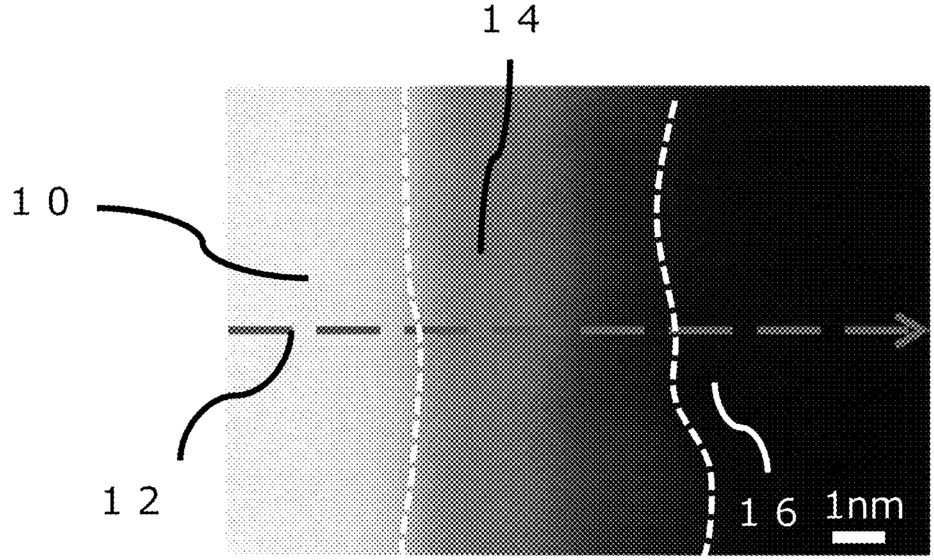
FIG. 2A is a STEM image and an element mapping diagram of a re-used alloy powder P1 of Example 1.
Figure 2B:
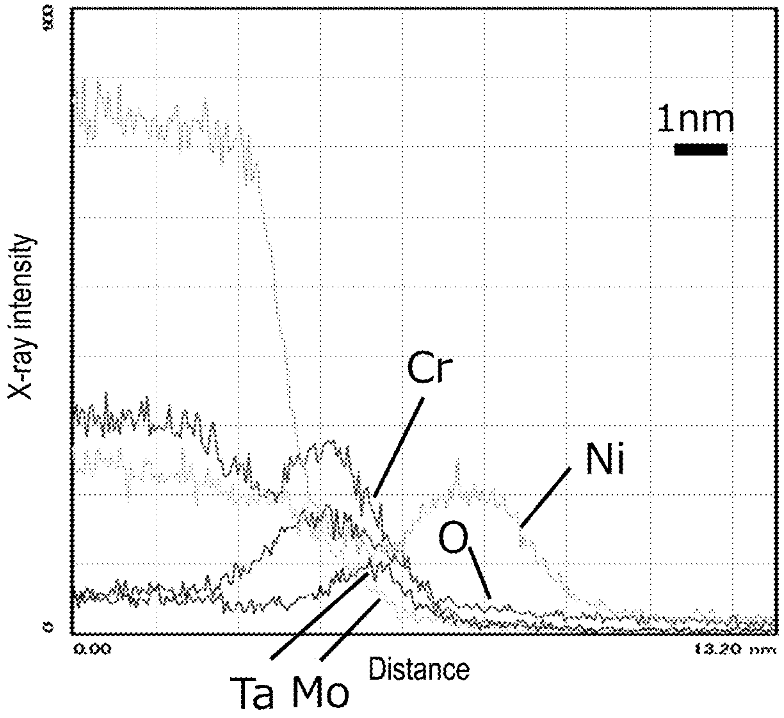
FIG. 2B is elemental analysis results thereof.
Figure 3A:
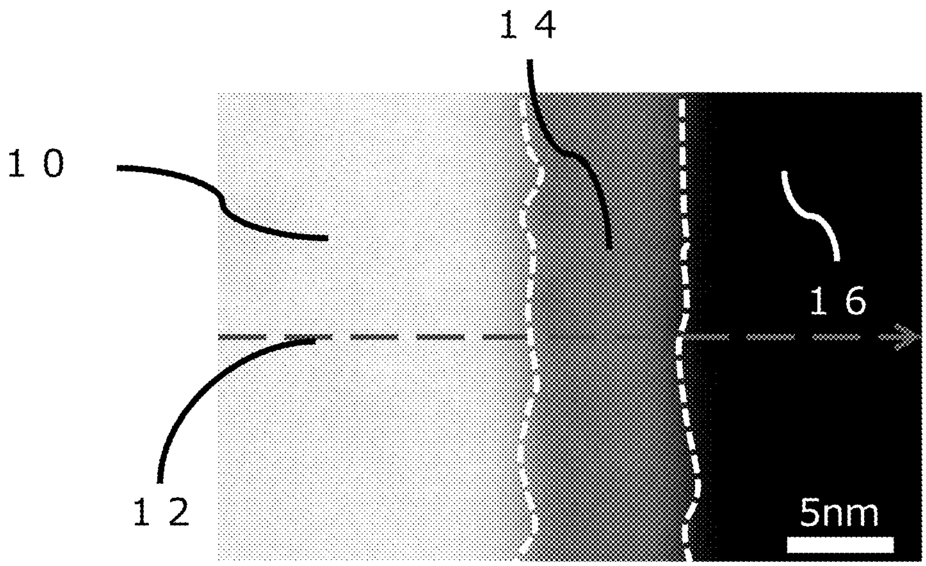
FIG. 3A is a STEM image and an element mapping diagram of a re-used alloy powder P2 of Example 1.
Figure 3B:
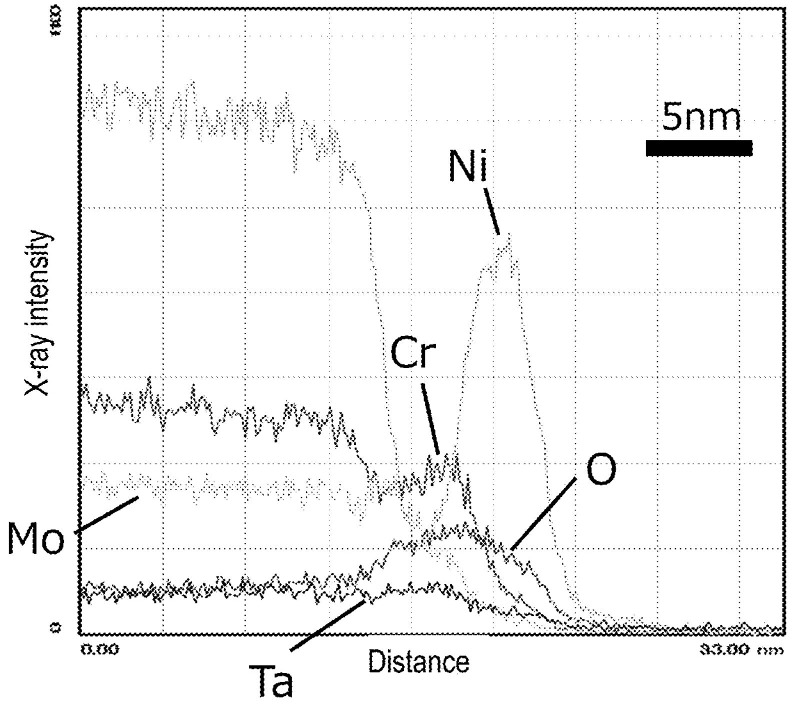
FIG. 3B is elemental analysis results thereof.
Figure 4A:
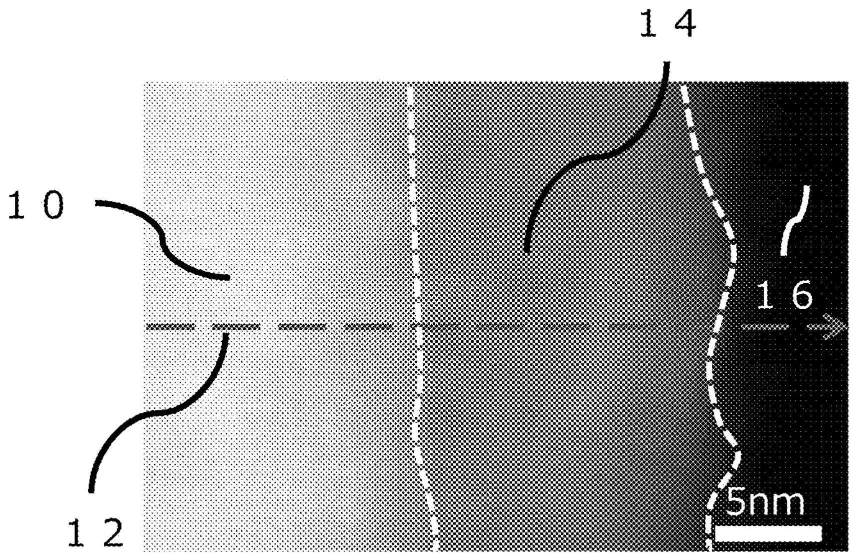
FIG. 4A is a STEM image and an element mapping diagram of a re-used alloy powder P3 of Example 1.
Figure 4B:
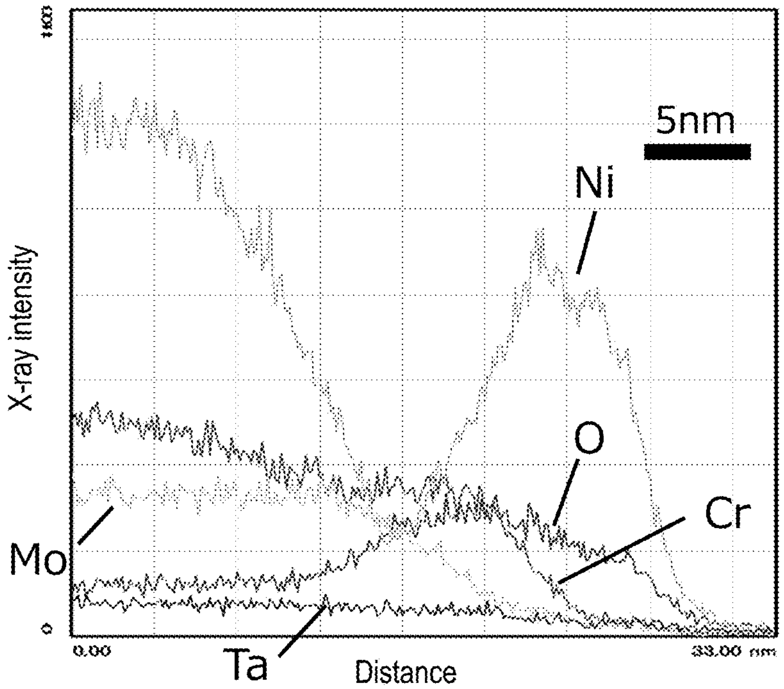
FIG. 4B is elemental analysis results thereof.

Next, FIG. 2A and FIG. 2B show an STEM image and elemental analysis results of the alloy powder P1, FIG. 3A and FIG. 3B show an STEM image and elemental analysis results of the alloy powder P2, and FIG. 4A and FIG. 4B show an STEM image and elemental analysis results of the alloy powder P3.

STEM (observation) images of the powder cross sections of P1 to P3 are shown in FIG. 2A, FIG. 3A, and FIG. 4A, respectively. In the figure, 10 denotes the powder body, 14 denotes an oxide film, and 16 denotes a carbon protective film provided to prevent surface contamination and oxidation during preparation of the observation sample. Moreover, the elemental analysis results are shown in FIGS. 2B, 3B, and 4B. The STEM image is a cross-sectional observation image when a powder particle is cut using a focused ion beam (FIB) micro-sampling device (FIB, manufactured by Hitachi High-Tech Corporation, Model: FB-2100, micro-sampling is a registered trademark of Hitachi High-Tech Corporation).

In addition, for elemental analysis, analysis and evaluation were performed using an energy dispersive X-ray spectroscopy (EDX) system equipped with a scanning transmission electron microscope. The measurement conditions for elemental analysis were: acceleration voltage: 200 kV; STEM mode: 5C, quantitative analysis: 30 Lsec, element map: 256×256, 0.01 msec/Pix; and line analysis: 256 Pix, 1.0 msec/Pix. The scanning direction for sampling was from the powder 10 side toward the oxide film 14 in the direction of the arrow of 12 in the figure.

As shown in FIGS. 2 and 3, in P1 and P2, a Ni peak can be seen outside Ta and Cr. That is, it was confirmed that an oxide mainly composed of Ni was formed near the outermost surface of the powder. In P3, Ta and Cr appear on the outside, but further outwards a Ni peak can be seen. From this, it was confirmed that in P3, an oxide mainly composed of Ni was also formed near the outermost surface.

Next, using merely the raw material powders P1 to P3, additive manufacturing is performed by the SLM method using an additive manufacturing device (Mlab Cusing 200R) of a PBF method, and additive manufacturing products (10 mm×10 mm×10 mm blocks) F1 to F3 were produced. The deposition conditions were: deposition thickness: 0.04 mm; laser power: 200 W; scanning speed: 800 mm/s; scanning pitch: 0.11 mm. The defect rate of the additive manufacturing product was then measured. Energy density (E): 56.8 J/mm3. The energy density (E) is the power (P) divided by the scanning speed (v), the scanning pitch (a), and the deposition thickness (d) (E=P/vad).

(Defect Rate)

The defect rate is the area ratio of defects obtained by image processing of a cross-sectional photograph (1.58 mm×1.25 mm) of the additive manufacturing product. The defect rate was measured using a microscope (Keyence VHX-6000), a threshold was set using the microscope's area ratio derivation function and was binarized, the area ratio of the defective parts that appeared black was determined, and the average value of the area ratios of five locations was calculated.

Table 2 shows the oxygen content of each of the alloy powders P1 to P3, the maximum thickness of the oxide film observed in the observation field, and the defect rate of the additive manufacturing products F1 to F3 produced by additive manufacturing using the powders. As shown in Table 2, it was confirmed that both F1 having an oxygen content (mass %) of 0.031% in the powder and F2 having an oxygen content of 0.047% were capable of producing additive manufacturing products with a defect rate of 0.1% or less (F1: 0.03%, F2: 0.06%).

On the other hand, the defect rate of F3, in which the maximum thickness of the oxide film was 18 nm but the oxygen content (mass %) in the powder was 0.106%, was 0.2%. Even if the defect rate was 0.2%, the material could still be put to practical use, but since minute inclusions were observed, it was predicted that the defect rate would increase further if P3 were further layered and re-used. For such reasons, the defect rate was set to be less than 0.2%, and the upper limit of the oxygen content was set to 0.106%. In addition, the thickness of the oxide film was 60 nm in Experiment 2 described below, also, since it is considered that the effect on the defect rate and inclusions is smaller than the effect on the oxygen content in the powder, the upper limit is preferably set at 100 nm.

TABLE 2

| | Oxygen content in the powder (mass %) | Maximum thickness of the oxide film (nm) | Defect rate (%) |
|---|---|---|---|
| P1 | 0.031 | 4 | <0.1 |
| P2 | 0.047 | 7 | <0.1 |
| P3 | 0.106 | 18 | 0.2 |

From the above, it was confirmed that if the alloy powder has oxygen content in the powder of more than 0.015% and less than 0.106% and an oxide film having the maximum thickness of 200 nm or less (excluding 0), the defect rate of the additive manufacturing product might be reduced, modeling might be stable, and defects might be suppressed.

Table 3 shows the mechanical properties of tensile strength, elongation, and Vickers hardness of the additive manufacturing products F1 to F3. The corrosion resistance of F3 (boiling 10% sulfuric acid and boiling 2% hydrochloric acid) was measured. In addition, Table 3 shows, as a reference example, the mechanical properties of tensile strength, elongation, and Vickers hardness of an additive manufacturing product using a new raw material powder, designated as F0. As shown in Table 3, the mechanical properties of the additive manufacturing products F1 to F3 using the alloy powder of the present invention are excellent, and the corrosion resistance was also excellent as shown in the results for F3, which was confirmed to be equivalent to the additive manufacturing product F0 using the new raw material powder.

TABLE 3

| | Tensile strength (MPa) | Elongation (%) | Vickers hardness (HV) | Corrosion Resistance Test boiling 10% sulfuric acid (mm/year) | Corrosion Resistance Test boiling 2% hydrochloric acid (mm/year) |
|---|---|---|---|---|---|
| F1 | 1018 | 43.7 | 291 | — | — |
| F2 | 1010 | 41.6 | 284 | — | — |
| F3 | 1004 | 39.1 | 290 | 0.024 | 0.008 |
| F0 | 1022 | 48.7 | 291 | 0.027 | 0.009 |

Example 2

An alloy powder P4 was prepared in which an alloy powder having an oxide film with a maximum thickness of 60 nm and an alloy powder having an oxide film with a maximum thickness of 50 nm were mixed. The oxygen content in the powder of the alloy powder P4 was 0.033 mass %. The alloy composition and powder particle size are the same as the alloy composition and powder particle size of P1 to P3. Further, the maximum thickness of the oxide film is the maximum thickness of the oxide film when observing the oxide film in the circumferential direction over a portion of 140 nm in the observation area.

Figure 5A:
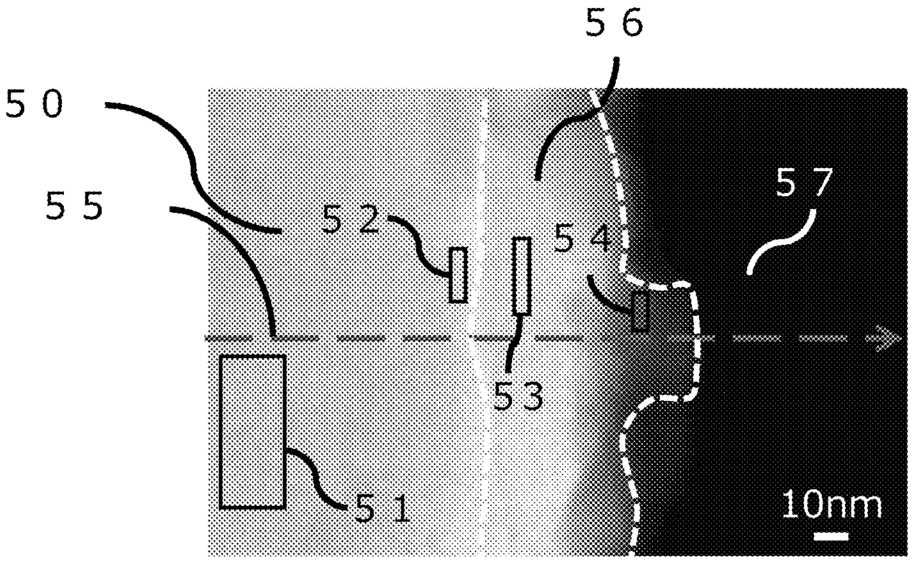
FIG. 5A is a STEM image and an element mapping diagram of a re-used alloy powder P4 of Example 2.
Figure 5B:
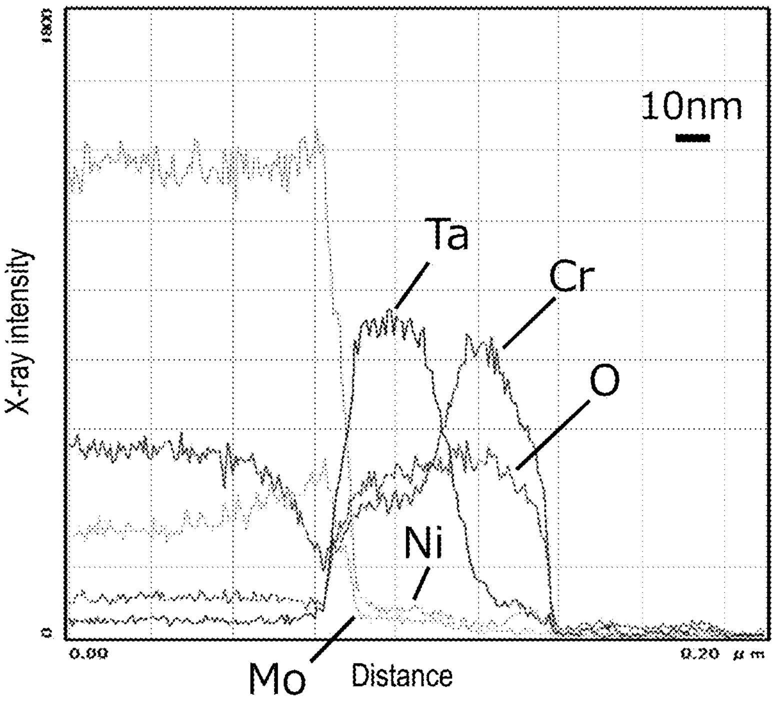
FIG. 5B is elemental analysis results thereof.
Figure 6A:
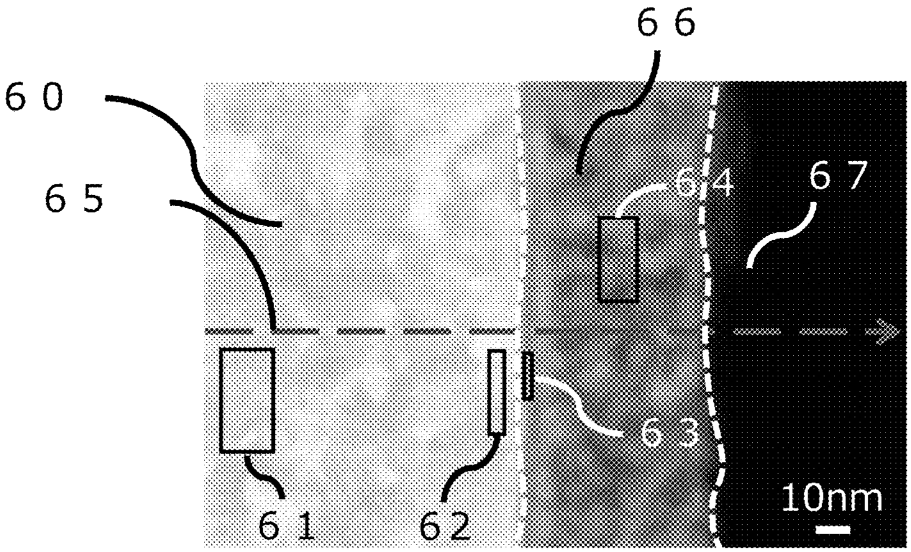
FIG. 6A is a STEM image and an element mapping diagram of the re-used alloy powder P4 of Example 2.
Figure 6B:
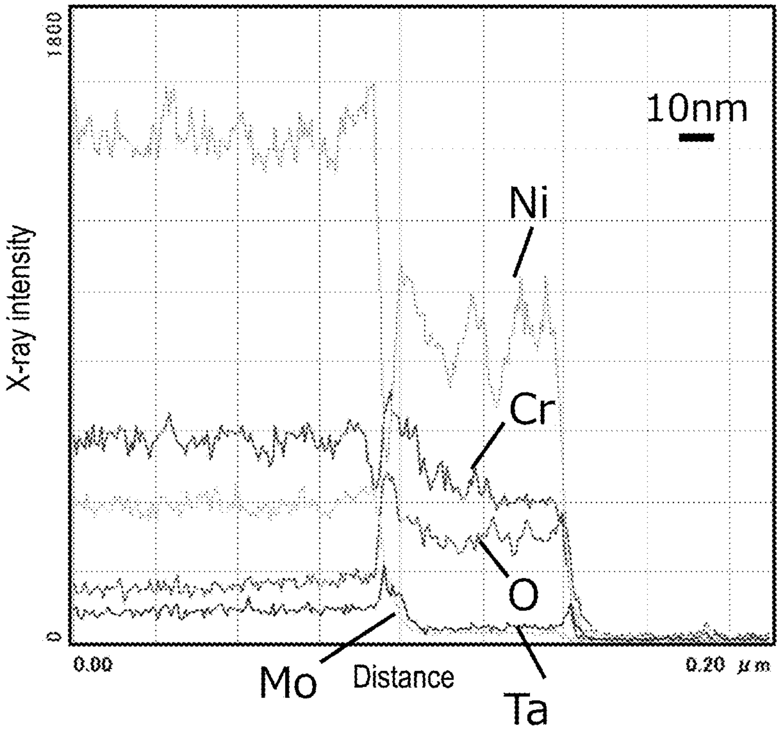
FIG. 6B is elemental analysis results thereof.

It was confirmed that P4 contained a mixture of an alloy powder having an oxide film including an oxide mainly composed of Ta, Cr, etc., as shown in FIG. 5B, and an alloy powder having an oxide film including an oxide mainly composed of Ni, as shown in FIG. 6B. Further, both of the alloy powders mixed together were re-used products. Also shown are the results of elemental analysis using EDX for each of analysis positions (51 to 54) shown in FIG. 5A. As shown in Table 4, it was confirmed that an oxide mainly composed of Ta, Cr, etc. was formed near the powder surface.

Also shown are the results of elemental analysis using EDX for each of analysis positions (61 to 64) shown in FIG. 6A. As shown in Table 5, it was confirmed that an oxide mainly composed of Ni was formed near the powder surface. Further, in the figures, 50 and 60 indicate the powder body, 56 and 66 indicate oxide films, 57 and 67 indicate carbon protective films, and 55 and 65 indicate the scanning direction.

TABLE 4

(mass %)

| Analysis position | | Ni | Cr | Mo | Ta | O |
|---|---|---|---|---|---|---|
| 51 | Powder | 59.3 | 18.0 | 22.1 | 0.6 | — |
| 52 | | 57.4 | 7.3 | 32.0 | 3.3 | — |
| 53 | Oxide film | 3.9 | 16.8 | 0.6 | 62.6 | 16.1 |
| 54 | | 4.4 | 63.4 | 1.2 | 13.1 | 17.9 |

TABLE 5

(mass %)

| Analysis position | | Ni | Cr | Mo | Ta | O |
|---|---|---|---|---|---|---|
| 61 | Powder | 56.0 | 17.5 | 25.2 | 1.3 | — |
| 62 | | 56.3 | 17.7 | 24.5 | 1.5 | — |
| 63 | Oxide film | 30.2 | 32.3 | 13.5 | 11.3 | 12.7 |
| 64 | | 64.1 | 26.1 | 0.4 | 2.3 | 6.9 |

An additive manufacturing product F4 was obtained by additive manufacturing under the same conditions as in Example 1 using the alloy powder P4. As with P1-P2, additive manufacturing might also be performed without any problems. Furthermore, it was confirmed that the defect rate of the obtained additive manufacturing product F4 was also 0.06% and defects could be suppressed.

From the above, it was found that if the oxygen content in the powder was more than 0.015% and less than 0.106%, and the maximum thickness of the oxide film was in the range of 200 nm or less (excluding 0), the moldability was not significantly affected, and the defect rate of the obtained additive manufacturing product was also able to be suppressed. In addition, if the oxygen content in the powder and the thickness of the oxide film were within the above-mentioned ranges, even when the alloy powder contained a mixture of an alloy powder having an oxide film including an oxide mainly composed of Ta, Cr, etc., as shown in FIG. 5B, and an alloy powder having an oxide film including an oxide mainly composed of Ni, as shown in FIG. 6B, the moldability was not significantly affected, and the defect rate of the obtained additive manufacturing product was also able to be suppressed.

Example 3

Using the above-mentioned additive manufacturing device, an additive manufacturing product was manufactured by the SLM method. The raw material powder prepared in Table 1 was repeatedly used and re-used a total of 69 times. During this time, when the powder decreased, a new powder was added five times. The same measurements as in Example 1 were carried out on the re-used Ni-based alloy powder. As a result, the oxygen content was 0.033 mass %. Such oxygen content corresponds to the oxygen content of 0.031 mass % in the simulated alloy powder P1. The maximum thickness of the oxide film was 1 nm to 60 nm.

In addition, the new raw material powder had a D10 of 18.4 μm, a D50 of 33.2 μm, and a D90 of 56.8 μm, after 69 times of reuse, the powder had a D10 of 20.5 μm, a D50 of 39.8 μm, and a D90 of 72.2 μm. That is, the particle size of the powder tended to increase as the powder was re-used. For example, when comparing the ratio of D90 to D10 (D90/D10), the ratio was 3.06 for the raw material powder and 3.5 for the powder re-used 69 times. It is believed that by setting the D90/D10 ratio in the range of 3.0 to 10.0, the fluidity of the alloy powder was maintained, and the additive manufacturing was able to be completed by suppressing poor powder spreading. In addition, as described below, it is believed that the defect rate of the additive manufacturing body could also be reduced by preventing insufficient melting of the alloy powder.

In addition, the defect rate of the additive manufacturing product was 0.06%, which was within the appropriate range of 0.2% or less. Furthermore, the mechanical properties and corrosion resistance of the additive manufacturing product was also measured, but no significant differences were found. From the above, it was found that there was no problem with about 70 times of reuse.

Figure 7:
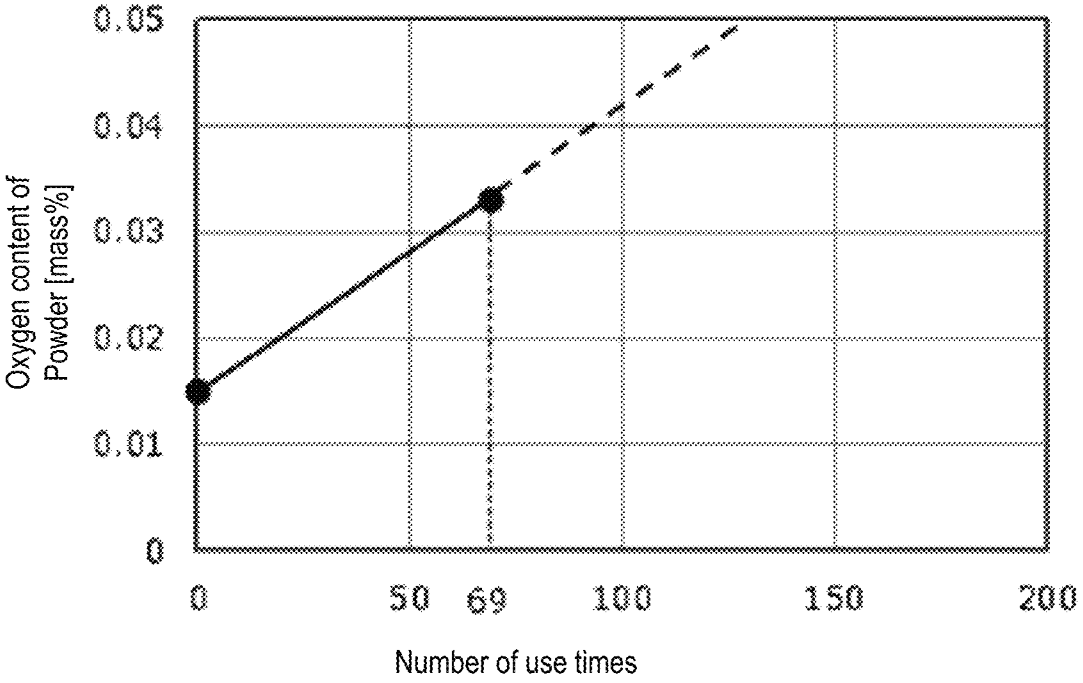
FIG. 7 is a diagram for estimating the change in oxygen content versus the number of times the re-used Ni-based alloy powder is re-used.

Therefore, the relationship between the number of reuse times and the oxygen content was estimated. First, the oxygen content of the new alloy powder was 0.015 mass %. Assuming that the oxygen content increases linearly, and combining the oxygen content with the results above, the relationship between the number of reuse times and the oxygen content shown in FIG. 7 is obtained. That is, even if the material is re-used 100 times, the oxygen content is predicted to be about 0.04 mass %. In reality, a new powder is added during the repetition, so it is believed that the increase in oxygen content can be further suppressed. In any case, as described above, it is desirable to obtain data on the number of times an unused alloy powder can be re-used, the oxygen content, and the number of times the alloy powder can be re-used, and the thickness of the oxide film, and to determine and grasp the number of times the alloy powder can be re-used in advance.

Example 4

Next, an example in which an Fe-based alloy powder was used will be described.

For the Fe-based alloy powder, an Fe—Ni alloy, which is a type of maraging steel, was used. The Fe—Ni alloy contained, in mass %, Ni: 14% to 22%, Ti: 0.1% to 5.0%, Al: 1% or less, and Si: 1% or less, P10 was a raw material powder (new) that had never been subjected to additive manufacturing, and P11 to P13 were alloy powders containing the raw material powder and a re-used alloy powder.

Table 6 shows the alloy compositions of P10 to P13 and the oxygen content in the powders. As shown in Table 6, the oxygen content (mass %) in the powder was 0.022% for P10, 0.028% for P11, 0.034% for P12, and 0.042% for P13. The oxygen content in the alloy powder was measured by the inert gas fusion-infrared absorption method as described above. Further, the volumetric method was used for Ni, the atomic absorption method was used for Co and Al, and the spectrophotometric method was used for Si, Mo, and Ti. Here, the average value of two measurements was calculated. The thickness of the oxide film of the powder was 1 nm to 10 nm for P10, and the maximum thickness of the oxide film was about 1 nm to 200 nm for P11 to P13. In addition, elemental analysis of the oxide films of P11 and P13 was performed, and it was confirmed that an alloy powder having an oxide film including an oxide mainly composed of Fe and an alloy powder having an oxide film including an oxide mainly composed of Si were mixed together. Further, the maximum thickness of the oxide film is the maximum thickness of the oxide film when observing the oxide film in the circumferential direction over a portion of 260 nm in the observation area.

Figure 8:
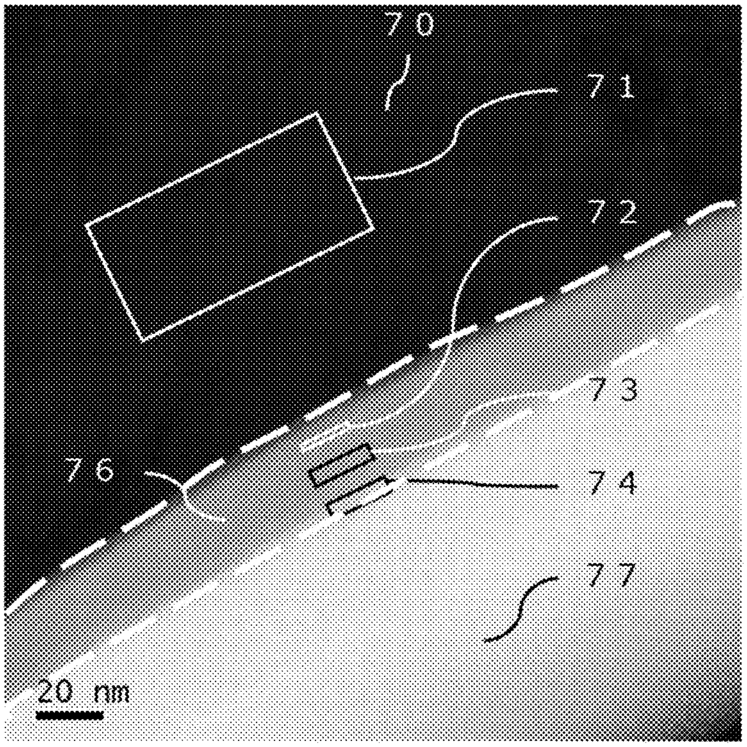
FIG. 8 is a STEM image and an element mapping diagram of a re-used alloy powder P13 of Example 4.
Figure 9:
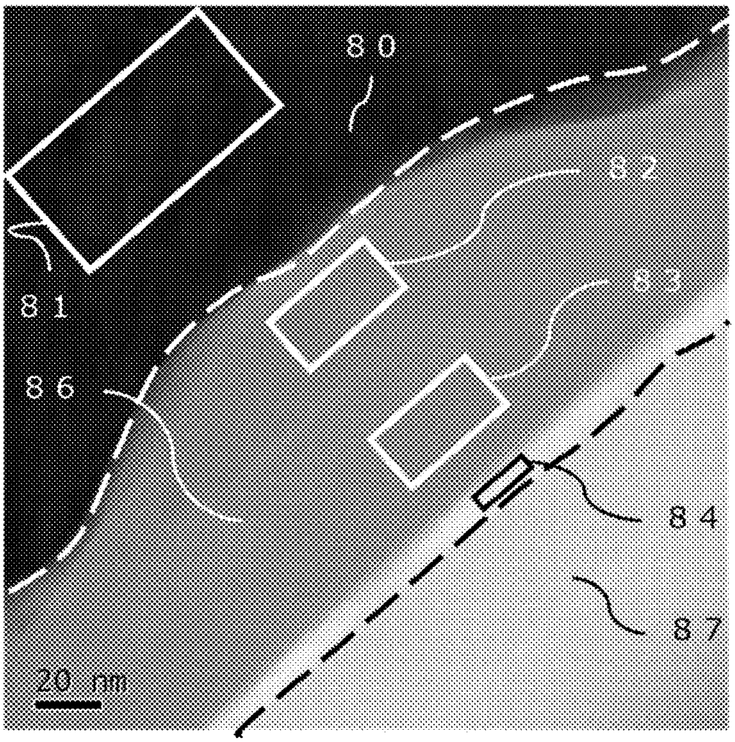
FIG. 9 is a STEM image and an element mapping diagram of the re-used alloy powder P13 of Example 4.
Figure 10:
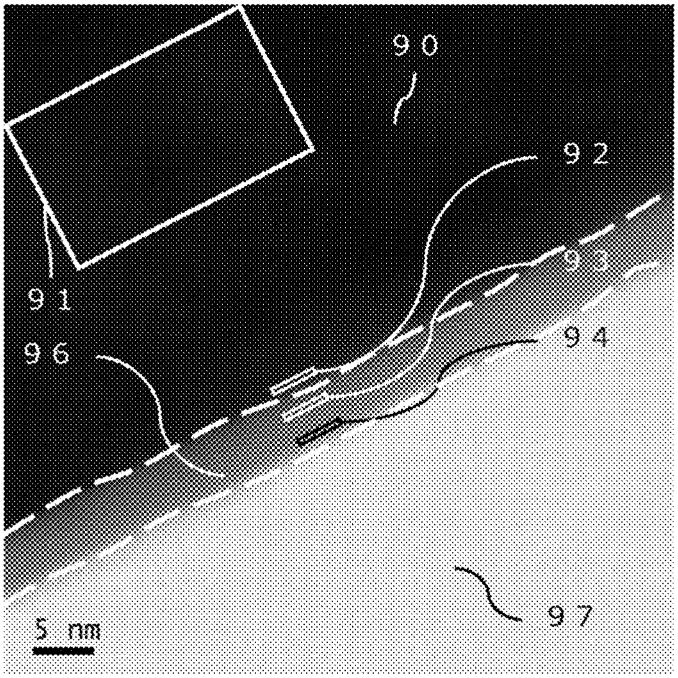
FIG. 10 is a STEM image and an element mapping diagram of the re-used alloy powder P13 of Example 4.

In addition, P12 contains a mixture of the alloy powders shown in FIGS. 8, 9 and 10, which are believed to include re-used items. Table 7 shows the results of elemental analysis using EDX for each of analysis positions (71 to 74) shown in FIG. 8. As shown in Table 7, it was confirmed that oxides mainly composed of Ti were formed near the powder surface. In addition, Table 8 shows the results of elemental analysis using EDX for each of analysis positions (81 to 84) shown in FIG. 9. As shown in Table 8, it was confirmed that oxides mainly composed of Si or Fe were formed near the powder surface.

In addition, Table 9 shows the results of elemental analysis using EDX for each of analysis positions (91 to 94) shown in FIG. 10. As shown in Table 9, it was confirmed that oxides mainly composed of Fe were formed near the powder surface. From the above, it was confirmed that P12 contained a mixture of an alloy powder having an oxide film including an oxide mainly composed of Ti, an alloy powder having an oxide film including an oxide mainly composed of Si, and an alloy powder having an oxide film including an oxide mainly composed of Fe. Further, in the figures, 70, 80, and 90 indicate the powder body, 76, 86, and 96 indicate oxide films, 77, 87, and 97 indicate carbon protective films, and 75, 85, and 95 indicate the scanning direction.

TABLE 6

(mass %)

| | Fe | Ni | Mo | Ti | Si | Al | O |
|---|---|---|---|---|---|---|---|
| P10 | Bal. | 18.00 | 1.96 | 1.98 | 0.31 | 0.14 | 0.029 |
| P11 | Bal. | 18.06 | 1.96 | 1.98 | 0.31 | 0.14 | 0.028 |
| P12 | Bal. | 18.03 | 1.97 | 1.97 | 0.31 | 0.14 | 0.034 |
| P13 | Bal. | 17.91 | 1.97 | 1.99 | 0.31 | 0.14 | 0.042 |

TABLE 7

(mass %)

| Analysis position | | Fe | Ni | Mo | Ti | Co | Si | Al | O |
|---|---|---|---|---|---|---|---|---|---|
| Powder | 71 | 77.6 | 18.4 | 2.1 | 1.1 | 0.4 | — | — | 0.4 |
| | 72 | 57.7 | 14.2 | 2.5 | 17.2 | 0.4 | — | 0.4 | 7.6 |
| Oxide film | 73 | 5.0 | 0.7 | — | 66.5 | — | — | 1.4 | 26.4 |
| | 74 | 3.1 | — | — | 57.7 | — | — | 5.8 | 33.4 |

TABLE 8

(mass %)

| Analysis position | | Fe | Ni | Mo | Ti | Co | Si | Al | O |
|---|---|---|---|---|---|---|---|---|---|
| Powder | 81 | 72.0 | 21.9 | 2.6 | 2.2 | 0.4 | — | — | 0.9 |
| Oxide film | 82 | 2.8 | — | — | 63.1 | — | — | 1.9 | 32.2 |
| | 83 | 2.5 | — | — | 50.2 | — | — | 14.1 | 33.2 |
| | 84 | 32.7 | — | — | 7.9 | — | 31.5 | 2.2 | 25.7 |

TABLE 9

(mass %)

| Analysis position | | Fe | Ni | Mo | Ti | Co | Si | Al | O |
|---|---|---|---|---|---|---|---|---|---|
| Powder | 91 | 77.5 | 17.1 | 2.2 | 1.4 | 0.8 | — | — | 1.0 |
| | 92 | 57.8 | 31.2 | 3.5 | 2.8 | 1.2 | 0.5 | — | 3.0 |
| Oxide film | 93 | 65.0 | 7.7 | — | 7.8 | — | 0.8 | — | 18.7 |
| | 94 | 64.3 | 2.5 | — | 4.0 | 0.3 | 3.4 | — | 25.5 |

Table 10 shows the measurement results of D10, D50, and D90 and the ratio of D90 to D10 (D90/D10) for each of P10 to P12. As shown in Table 10, the ratio of D90 to D10 (D90/D10) was 3.08 for P10, 3.29 for P11, and 3.3 for P12. Since D90/D10 was in the range of 3.0 to 10.0, it is believed that the fluidity of the alloy powder was maintained, which prevented poor powder spreading, and the additive manufacturing was able to be completed without problems. In addition, as described below, it is believed that the defect rate of the additive manufacturing body could also be reduced by preventing insufficient melting of the alloy powder. In addition, in an integrated distribution curve showing the relationship between particle size and volume integration from the small particle size side obtained by a laser diffraction method, an integrated frequency of 10 volume % is D10, an integrated frequency of 50 volume % is D50, and an integrated frequency of 90 volume % is D90.

TABLE 10

| | D10(μm) | D50(μm) | D90(μm) | D90/D10 |
|---|---|---|---|---|
| P10 | 18.7 | 34.1 | 57.6 | 3.08 |
| P11 | 18.8 | 34.6 | 58.8 | 3.29 |
| P12 | 18.7 | 35.1 | 61.7 | 3.3 |

Next, additive manufacturing products were produced using each of the alloy powders P11 to P13. A 250×250×36 mm base plate (made of S50C) was placed on a modeling platform, additive manufacturing products (prism shapes of 57 mm×12 mm×12 mm height, 40 mm×10 mm×10 mm height, and 10 mm×10 mm×10 mm height) were modeled on the base plate. The additive manufacturing product produced using P11 was designated F11, the additive manufacturing product produced using P12 was designated F12, and the additive manufacturing product produced using P13 was designated F13. The modeling conditions were: power (P): 250 W; scanning speed (v): 600 mm/s; scanning pitch (a): 0.09 mm; deposition thickness (d): 0.05 mm; and energy density (E): 92.6 J/mm3. The energy density (E) is the power (P) divided by the scanning speed (v), the scanning pitch (a), and the deposition thickness (d) (E=P/vad).

The defect rates of the additive manufacturing products (10 mm×10 mm×10 mm) F11 to F13 were measured. As a result, the defect rate was about 0.13% for F11, about 0.16% for F12, and about 0.15% for F13, and the defect rate was 0.2% or less for all of F11 to F13. Further, in the embodiment, the defect rate is the area ratio of defects obtained by image processing of a cross-sectional photograph (1.58 mm×1.25 mm) of the additive manufacturing product. The defect rate was measured using a microscope (Keyence VHX-6000), a threshold was set using the microscope's area ratio derivation function and was binarized, the area ratio of the defective parts that appeared black was determined, and the average value of the area ratios of five locations was calculated.

TABLE 11

| | Oxygen content in the powder (mass %) | Maximum thickness of the oxide film (nm) | Defect rate (%) |
|---|---|---|---|
| P10 | 0.022 | 1~20 | 0.13 |
| P11 | 0.028 | 1~200 | 0.16 |
| P12 | 0.034 | 1~200 | 0.16 |
| P13 | 0.042 | 1~200 | 0.15 |

From the above, it was confirmed that if the alloy powder has oxygen content in the powder of more than 0.015 mass % and less than 0.0106 mass % and an oxide film having the maximum thickness of 1 nm or more and 200 nm or less, the defect rate of the additive manufacturing product might be reduced, modeling might be stable, and defects might be suppressed.

The additive manufacturing products F11 to F13 were evaluated for 0.2% yield strength, tensile strength, elongation, reduction in area, and Charpy impact value. Table 12 shows the results of 0.2% yield strength, tensile strength, elongation, reduction in area, and Charpy impact value of the additive manufacturing products F11 to F13. As shown in Table 12, it was confirmed that the mechanical properties of the additive manufacturing products F11 to F13 were equivalent to the mechanical properties of the additive manufacturing product F10 using the raw material powder.

TABLE 12

| | 0.2% yield strength (MPa) | Tensile strength (MPa) | Elongation (%) | Reduction in area (%) | Charpy impact value (J/cm$^2$) |
|---|---|---|---|---|---|
| F10 | 1078 | 1167 | 25.9 | 49.4 | 55.8 |
| F11 | 1077 | 1164 | 25.8 | 46.9 | 58.3 |
| F12 | 1074 | 1161 | 25.7 | 48.6 | 58.9 |
| F13 | 1071 | 1163 | 25.8 | 49.1 | 57.0 |

From the results of Example 4, it was found that even in the Fe-based alloy powder, if the oxygen content in the powder was more than 0.015% and less than 0.106%, and the maximum thickness of the oxide film was in the range of 200 nm or less (excluding 0), the moldability was not significantly affected, and the defect rate of the obtained additive manufacturing product was also able to be suppressed. In addition, it was confirmed that if the oxygen content in the powder was more than 0.015% and less than 0.106%, and the maximum thickness of the oxide film was in the range of 200 nm or less (excluding 0), even when the alloy powder contained a mixture of an alloy powder having an oxide film including an oxide mainly composed of at least one of Ni, Ti, Si, or Al and an alloy powder having an oxide film including an oxide mainly composed of Fe, the moldability was not significantly affected, and the defect rate of the obtained additive manufacturing product was also able to be suppressed.

The above-mentioned embodiments and examples have been described to assist in the understanding of the present invention, and the present invention is not limited to merely the specific configurations described. For example, a part of the configuration of one embodiment may be replaced with the configuration of another embodiment, and the configuration of another embodiment may also be added to the configuration of one embodiment. In other words, in the present invention, a part of the configuration of the embodiments and examples of the present specification may be deleted, and replaced with, or added to another configuration.

What is claimed is:

1. A re-used alloy powder for additive manufacturing, comprising:

an oxide film on a surface of the alloy powder, wherein the alloy powder is a Ni-based alloy and contains, in mass %, equal to or more than 0.031% and less than 0.106% of oxygen, and the oxide film having a maximum thickness of 200 nm or less (excluding 0), wherein an oxide mainly composed of Ni is next or nearest to an outermost surface of the oxide film.

2. The re-used alloy powder for additive manufacturing according to claim 1, wherein the oxide film has a maximum thickness of 100 nm or less (excluding 0).

3. The re-used alloy powder for additive manufacturing according to claim 1, wherein the oxide film has a maximum thickness of 1 nm or more and 100 nm or less.

4. The re-used alloy powder for additive manufacturing according to claim 1, wherein the alloy powder contains, in mass %, Cr: 14.5% or more and 24.0% or less, and Mo: 12.0% or more and 23.0% or less, and
the remainder consists of Ni and inevitable impurities.

5. The re-used alloy powder for additive manufacturing according to claim 1, wherein in the alloy powder, a ratio of an integrated frequency of 90 volume % to an integrated frequency of 10 volume % in an integrated distribution curve showing a relationship between particle size and volume integrated from a small particle size side obtained by a laser diffraction method is 3.0 or more and 10.0 or less.

6. A method for producing an additive manufacturing product, comprising: using an alloy powder containing the re-used alloy powder for additive manufacturing according to claim 1 as a raw material powder; and performing additive manufacturing using the raw material powder.

7. The method for producing an additive manufacturing product according to claim 6, wherein the raw material powder contains a re-used alloy powder for additive manufacturing having an oxide film including an oxide containing Ni as the most abundant element among elements contained other than oxygen and an alloy powder for additive manufacturing having an oxide film including an oxide containing an element other than Ni as the most abundant element among elements contained other than oxygen.

* * * * *